N. ARBEITEL
REVERSIBLE COUNTER SHAFT.
APPLICATION FILED SEPT. 18, 1919.

1,331,891.

Patented Feb. 24, 1920.

WITNESSES
E. A. Wilson
J. C. Ledbetter

INVENTOR
Norbert Arbeitel
BY
ATTORNEYS

UNITED STATES PATENT OFFICE.

NORBERT ARBEITEL, OF BRIDGEPORT, CONNECTICUT.

REVERSIBLE COUNTER-SHAFT.

1,331,891.  Specification of Letters Patent.  Patented Feb. 24, 1920.

Application filed September 18, 1919. Serial No. 324,547.

*To all whom it may concern:*

Be it known that I, NORBERT ARBEITEL, a citizen of the United States, and a resident of the city of Bridgeport, county of Fairfield, State of Connecticut, have invented a new and Improved Reversible Counter-Shaft, of which the following is a full, clear, and exact description.

This invention relates to counter shafts, more particularly to a two-direction counter shaft for shops, factories, and mills.

An object of this invention is to provide a counter shaft for transmitting power from a line shaft to a machine tool such as a lathe, drill press, milling tool or other machinery. A special purpose is to provide a counter shaft capable of being reversed in direction in order to remove a cutting tool such as a drill from work, and in order to return the carriage of a milling tool from one end of the machine to the other. Likewise it is desirable to provide a two-direction counter shaft equipment in order to facilitate and execute the machine work in a more rapid manner than is possible by employing old counter shafts in present day use. It is an object to provide this counter shaft with a step-up speed gear in order to increase the reversing speed of said counter shaft when it is desired to remove a drill or other cutting tool from work.

With the above and other objects in view, the invention has relation to the several counter shaft designs as presented in the appended claims, and as described for one preferred example of counter shaft in the following specification and in the accompanying drawings, wherein:

Figure 1:
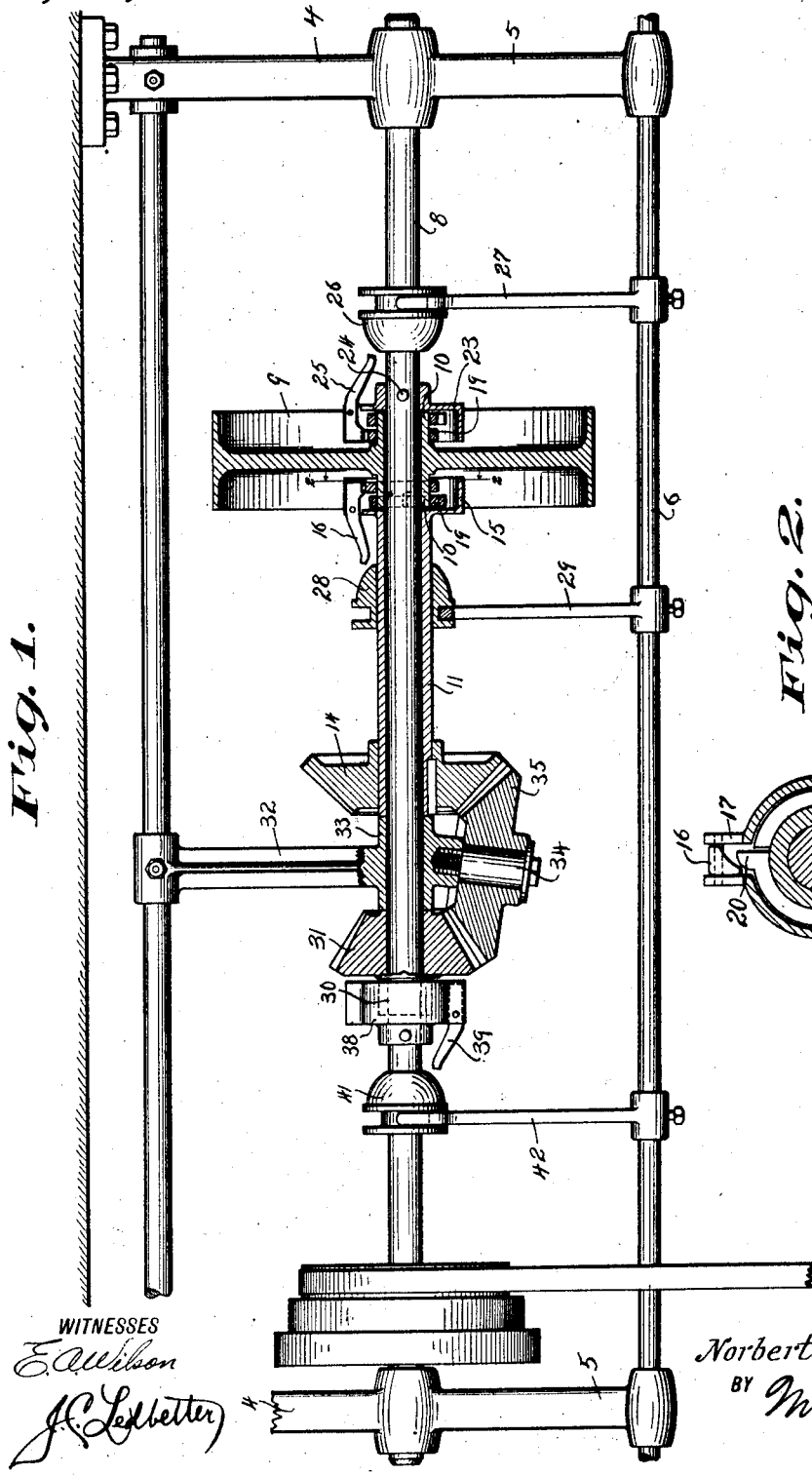
Figure 1 illustrates a counter shaft assembly installed on the ceiling of a factory, shop or other place and ready for work. Many parts are shown in section to facilitate an understanding of the working parts.

A two-direction or reversible counter shaft built under the plans and specification of this invention embodies an ordinary counter shaft journaled in hanger brackets with a step cone pulley mounted on the shaft to drive a machine tool such as a drill press or lathe. The counter shaft is provided as usual with a power shaft adapted to receive a belt for suitably running the counter shaft and step cone pulley. The shaft is provided with a set of clutches manually operated by a mechanic using the machine. Likewise the shaft has journaled thereon a tube which tube is connected and disconnected at will with the power pulley in order to permit the mechanic to run said counter shaft and cone pulley in either direction desired.

Referring now more in particular to the drawings for a detailed discussion of my invention, the reference numeral 4 points out a hanger set which mounts the operating parts, and which is usually bolted to the ceiling over a machine tool in order to be conveniently adjacent said machine tool. The hangers 4 have extended arms 5 which slidably support a shifter shaft 6. The shifter shaft 6 may be subjected to a lateral motion through the bearings integral with the arms 5, and this action is executed by a shifter lever of ordinary type or any other means known in shop practice. This lever is not shown in the drawings since it merely comprises an ordinary lever bar which the mechanic actuates back and forth to shift the shaft in order to run the counter shaft in one direction or the other.

The hangers 4 journal a counter shaft 8. The counter shaft is provided with a power pulley 9 said pulley being freely journaled thereon. This pulley 9 usually receives power transmitted thereto by a belt reaching from a main power shaft. The power pulley is provided with a hub extension 10 formed integral with the pulley spokes as is the usual practice and said hub functioning to journal the pulley on the counter shaft 8 and also functions to journal certain clutch rings as later seen.

Figure 2:
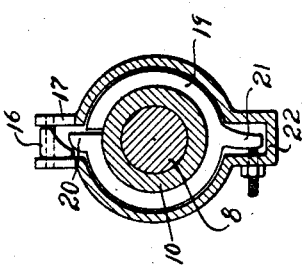
Fig. 2 illustrates a cross sectional view of the counter shaft taken on the line 2—2 of the other figure, and shows one form of clutch which may be used in the counter shaft.

A tube 11 is journaled on the counter shaft 8. On one end of this tube is fixed a drive pinion 14 to rotate with the tube, while on the other end of this tube is mounted a clutch cuff 15. The clutch cuff may be formed integral with the tube, or otherwise fixed thereto. The clutch cuff is provided with a clutch dog 16 pivotally mounted on the clutch cuff. The clutch cuff may have a pair of parallel spaced ears 17 to pivotally mount the clutch dog 16. A clutch ring 19 is freely journaled on each hub extension, and may be formed of one or more ring sections according to the characteristics of the size and capacity of the counter shaft, or according to the power value to be transmitted therethrough. The clutch rings are carried on each hub extension 10 and normally remain stationary while the pulley hub rotates in said clutch rings. The clutch rings are split as shown in Fig. 2 and one ring section terminates in a cam 20 made integral on the end of the split ring. A lug 21 is integrally formed with the ring diametrically opposite the split and the cam 20. The lug 21 is positioned in a recess 22 formed in the clutch sleeve, while the cam 20 is positioned between the ears 17. The inner end of the clutch dog 16 is positioned directly over and adjacent the cam 20, and the adjacent faces of the cam 20 and clutch dog 16 are engageable and have co-acting cam faces.

A clutch sleeve 23, similar in design to the one heretofore described, is fixed to the counter shaft 8 by a pin 24 or other means more suitable. This clutch sleeve carries a clutch dog 25 to engage the clutch ring 19. This clutch is similar in design, and functions identically the same as the previously described clutch ring.

A cone lock 26 is slidable on the counter shaft 8 and is provided with a groove engaged by a shifter arm 27, said shifter arm being fixedly mounted on the shifter shaft 6. This cone lock is slidable along the shaft 8 to engage and disengage the clutch dog 25. A similar cone lock 28 is slidably mounted on the tube 11 and arranged to engage and disengage the clutch dog 16. The cone lock 28 is associated with a forked shifter arm 29 fixed to the shifter shaft 6. This last described cone lock is provided to act in connection with the clutch dog 16 to engage and disengage the clutch members 19 and 15 which are associated with the tube 11.

A driving pinion 31 is provided with a hub extension 30, and is freely journaled on the shaft 8 and is preferably somewhat less in diameter than the gear 14. A hanger 32 is provided with a bearing 33 to space apart the gears 14 and 31, and the bearing also supports a stud 34, which stud carries a beveled driving pinion 35 meshing with the gears 14 and 31. The gear 31 is therefore driven through the intermediate pinion 35, and said gear 31 rotates freely upon the shaft 8 unless engaged by a clutch employed to lock it with the counter shaft. A description will now be given of a clutch associated with the driven gear 31.

A clutch identical in design, and functioning similarly to the clutches hereinbefore described is fixed to the counter shaft 8 adjacent the gear 31, and this clutch comprises a clutch sleeve 38 fixed to the shaft by a pin, key or other suitable means. The clutch cuff has pivotally attached thereto a clutch dog 39 to engage a clutch ring which is freely journaled on the hub extension 30 to permit relative rotation of the gear 31 and clutch ring during the disconnected operation of the gear 31 and shaft 8.

Another cone lock 41 is associated with a shifter arm 42 and is adapted to be moved back and forth on the counter shaft 8 to engage and disengage the clutch dog 39. This last named cone lock is the same as the cone locks previously described, and functions the same as the other cone lock.

A description will now be given of the operation of this two-direction counter shaft in order that a still clearer comprehension may be had of the invention. The position of all parts shown in drawings is an idle position, that is to say the power pulley 9 is freely rotating on the shaft 8, and not turning the counter shaft and cone pulley in either direction.

The operator may shift the shaft 6 to the left which instantly engages the cone lock 26 with the clutch dog 25 thereby locking the drive pulley 9 with the counter shaft 8. This causes the counter shaft 8 and its attached cone pulley to be directly driven with the pulley 9, and driven in equal speed ratio or relation with said pulley 9.

When however, the operator desires to reverse the direction of his work, he will move the shifter shaft 6 to the right which engages the cone lock 28 with the clutch dog 16, and also engages the cone lock 41 with the clutch dog 39. This engagement of the cone lock 28 with the clutch dog 16 locks the cuff 15 and attached tube 11 with the pulley 9 and causes said tube to rotate in positive unison with said pulley. The tube 11 rotates the gear 14 which in turn drives the pinion 35, and this pinion 35 drives the driven gear 31. The clutch 41 and clutch dog 39 were simultaneously engaged or locked together when the cone lock 28 moved into engagement with the clutch dog 16; therefore, the clutch sleeve 38 and counter shaft 8 became locked with the gear 31, and this action causes the counter shaft 8 to be indirectly driven through the intermediate gear 35. This reverses the direction of rotation of the counter shaft, and also increases its rotation in speed relation to the rotation of the main drive pulley 9.

Any suitable clutch and locking device may be employed in connection with two-direction counter shaft constituting this invention. The clutch and lock means herein disclosed is merely one example of a suitable form of clutch and cone which may be used. In the operation of the form of clutch described, the cone lock moves under the clutch dog which causes one end of the clutch dog to be thrust downwardly against the cam 20 of the ring 19, and as this occurs the clutch ring 19 exercises a gripping and clamping action against the hub upon which it rotates. This causes the hub to become fixed in relation with the clutch, the result of which is to lock the pulley or gear as a driving member with the cuff as a driven member and thus cause positive rotation between the two elements.

This two-direction counter shaft will adequately fill a long felt want in shops, factories and mills for a reversible power transmission means. It will eliminate waste incurred in using separate belts and separate driving elements for reversing the direction of machinery.

Having thus described my invention I claim as new and desire to secure by Letters Patent:

1. In a reversible counter shaft, comprising in combination; a shaft, a power pulley freely journaled thereon, a clutch associated with the power pulley and shaft such that the shaft and power pulley may be locked together to rotate in unison, another clutch associated with the power pulley, and a gear transmission associated with the last named clutch to run the shaft in the opposite direction from the power pulley.

2. In a reversible counter shaft, comprising in combination; a shaft, a power pulley freely journaled thereon, a clutch associated with the power pulley and shaft such that the shaft and power pulley may be locked together to rotate in unison, another clutch associated with the power pulley, and a gear transmission associated with the last named clutch to run the shaft in the opposite direction from the power pulley, and shiftable locking means employed for engaging and disengaging the aforesaid clutches.

3. A reversible counter shaft, comprising in combination: a counter shaft suitably mounted in journal supports, a power pulley carried on the counter shaft and free to rotate thereon, a clutch fixed to the shaft and functioning to engage or disengage the power pulley in order to cause said pulley to directly rotate the shaft or to rotate freely thereon, a gear mounted on the counter shaft and free to rotate thereon, a clutch fixed to the gear and coöperating with the power pulley to engage or disengage the power pulley in order to cause the gear and power pulley to rotate in unison or rotate relatively one with the other, a power transmission engaging the gear, and another clutch associated with the power transmission and shaft in order to lock or unlock the power transmission with the counter shaft.

4. A reversible counter shaft, comprising in combination: a counter shaft suitably carried in journal supports, a power pulley carried on the counter shaft and free to rotate thereon, two clutches associated with the power pulley and one of said clutches associated with the counter shaft, a driven member associated with the other clutch such that said driven member may be locked with the power pulley to rotate in unison therewith or free to rotate relatively and separately with said power pulley, another driven member journaled on the counter shaft and free to rotate thereon, a clutch associated with the counter shaft and last named driven member to lock or unlock the last named driven member with said counter shaft, and an intermediate driving means disposed between the two driven members in order to reverse the direction of the last named driven member.

NORBERT ARBEITEL.